Oct. 21, 1969  P. T. HARRELL  3,473,615
PEANUT DIGGER

Filed June 16, 1967  2 Sheets-Sheet 1

INVENTOR
PRESTON HARRELL
BY Wilmer Mecklin
HIS ATTORNEY

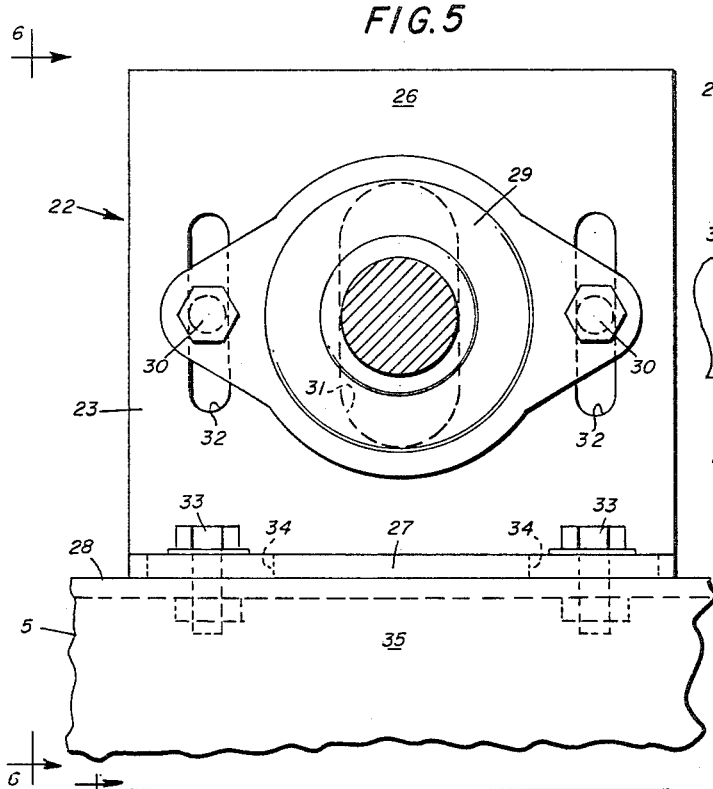
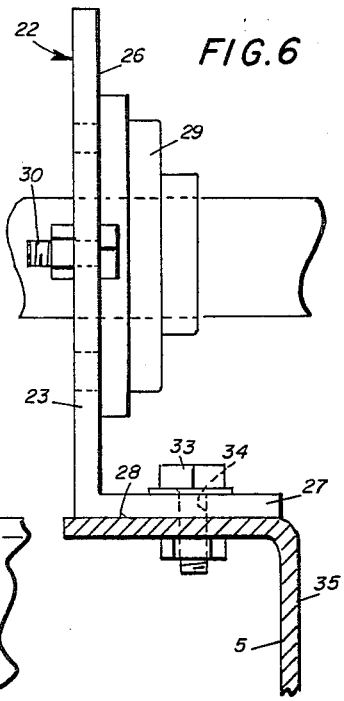
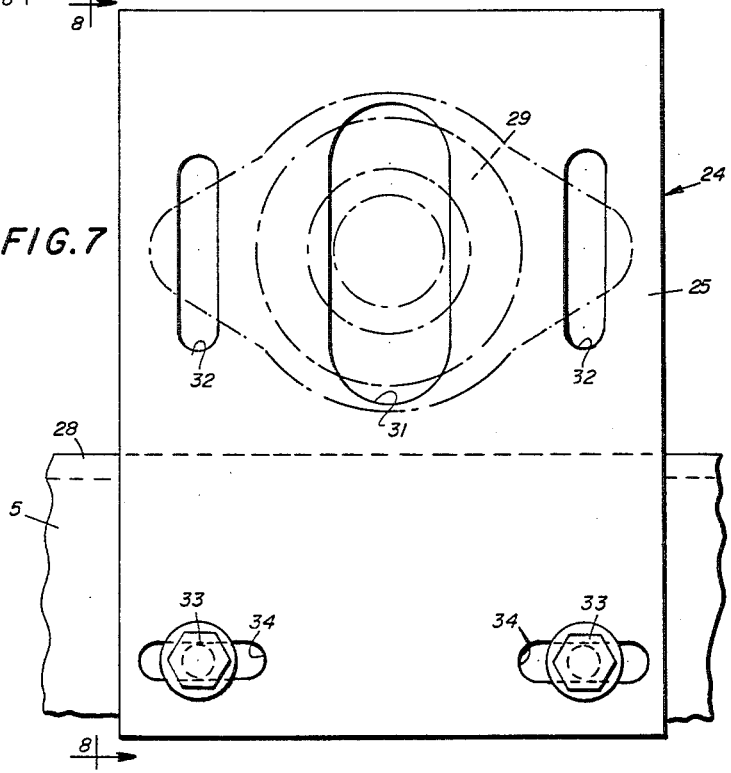
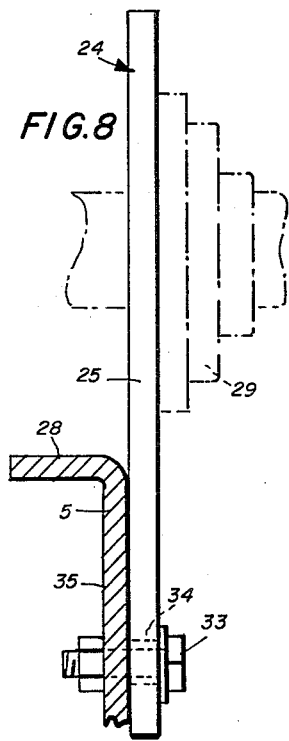

3,473,615
Patented Oct. 21, 1969

3,473,615
PEANUT DIGGER
Preston T. Harrell, Waverly, Va. 23890
Filed June 16, 1967, Ser. No. 646,514
Int. Cl. A01d 29/00, 17/00
U.S. Cl. 171—116    9 Claims

ABSTRACT OF THE DISCLOSURE

A tractor-towed wheeled digger for peanuts and like underground edibles grown on vines, having an upwardly and backwardly sloping straight kicker frame mounting kickers on a series of shafts for lifting and loosening dirt from the vines and edibles, plows at the front for plowing up the edibles and passing them and their vines to the kickers, guides at the rear of the frame cooperating with certain kickers for turning the vines over as they are redeposited on the ground, and adjustable mounts for certain of the shafts for relatively positioning them to suit various soil conditions.

BACKGROUND OF THE INVENTION

Mounted on wheels and designed to be pulled by tractors, conventional peanut diggers dig peanuts from the ground by flat laterally extended plows which are so tilted as to ride underground below and dig up the peanuts without severing them from their vines. With the peanuts attached, the vines are passed from the plows to kickers mounted on a series of radially spaced, laterally extending shafts which are mounted on a common frame for rotation about horizontal axes in the same upwardly and rearwardly sloping plane. By exerting a rearward kicking action thereon, the kickers propel the vines rearwardly and shake dirt from the vines and the peanuts. On leaving the kickers the vines are redeposited on the ground in the track of a smoothing roller to await subsequent harvesting of the peanuts. Since there usually is a delay of several days between the digging and the harvesting and the peanuts will rot if in contact with the ground, it was proposed to equip a conventional digger at the back with guide fingers for turning the vines over as they were redeposited on the ground behind the usual smoothing roller, so as to enable them to hold the peanuts above ground until harvested. The desired result was not produced on a digger having its kicker shafts in the usual laterally aligned arrangement and, for even limited success in turning the vines over, it was necessary also to position the penultimate kicker shaft above the common plane of the other shafts.

In keeping with the prior practice of fixing the axes of the shafts relative to the frame, the repositioning was achieved by bending the side rails of the frame downwardly from a point between the penultimate and immediately preceding shafts and mounting the penultimate shaft on top of the downwardly bent portion, while leaving the remaining shafts suspended as usual from the bottoms of the rails. So repositioned, the penultimate shaft was not only above the plane of the preceding shafts but also above the level of the last shaft. As a result, the vines, in being driven rearwardly by the kickers, were caused to follow a rearward path which changed from upsloping to downsloping at the kickers of the penultimate shaft. Presumably, it was the positive downward force imparted by the kickers of the last two shafts to the vines as they reached the fingers, that enabled the latter to turn the vines over. It is with the problem of rendering both existing and new diggers effective to turn over the vines as they are returned to the ground that the present invention is particularly concerned.

THE ABSTRACT OF THE INVENTION

The improved digger of the present invention not only enables the kickers to apply a positive downward driving force to the vines as they approach the guide fingers without need to resort to the expensive bending of the frame, but, contrary to the bent frame form with its fixed-axis kicker shafts, also recognizes that different soil conditions will impose different drags on the vines and correspondingly vary the required downward force. Acceptably conventional otherwise, the improved digger of this invention mounts its series of kicker shafts on a common frame with at least the penultimate shaft adjustably positionable relative to the frame for adjusting as necessary the positive downward force applied to the vines as they approach the guide fingers. Incorporable in a new digger for rendering it effective under various soil conditions and even with a straight frame, to turn over the vines as they are redeposited on the ground, the improved assembly can readily be embodied in an existing digger with only minor and inexpensive modifications of the latter.

With the foregoing its main objectives, other objects and advantages of the present invention will appear here and after in the detailed description, be particularly pointed out in the appended claims and be illustrated in the accompanying drawings, in which:

FIGURE DESCRIPTION

FIGURE 5 is a fragmentary sectional view on an enlarged scale showing an adjustable mounting at an end of one of the kickers;

FIGURE 6 is a sectional view taken along lines 6—6 of FIGURE 5;

FIGURE 7 is a fragmentary view corresponding to FIGURE 5, showing another form of adjustable mounting; and FIGURE 8 is a sectional view taken along lines 8—8 of FIGURE 7.

DETAILED DESCRIPTION

Figure 1:
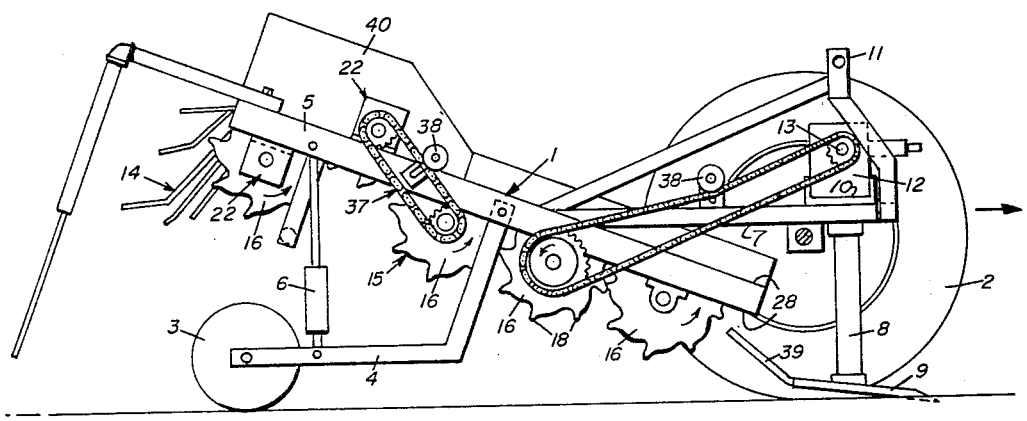
FIGURE 1 is a side elevational view taken from one side, of a preferred embodiment of the improved digger of the present invention, with portions broken away and shown in section to more clearly illustrate certain of the details of construction.
Figure 2:
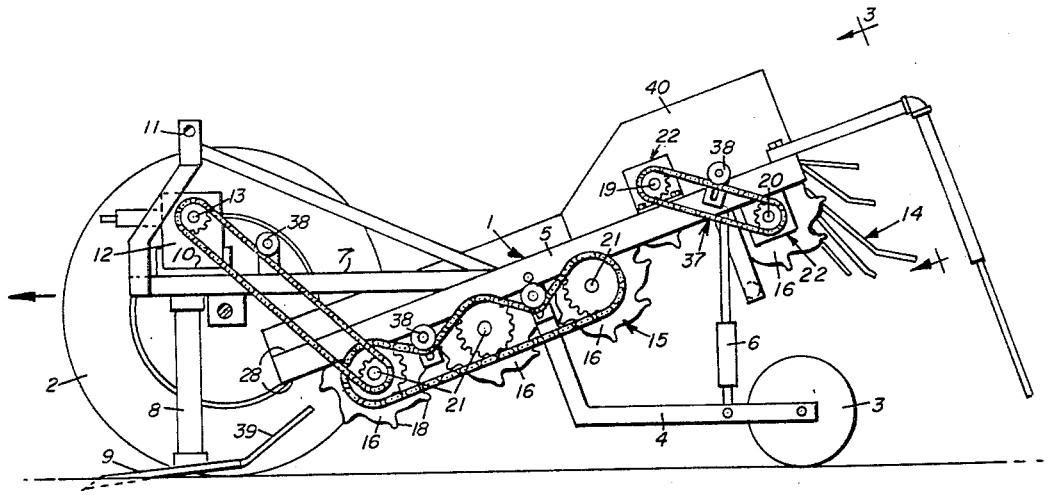
FIGURE 2 is a side elevational view of the digger of FIGURE 1 taken from the opposite side, with portions broken away and shown in section to more clearly illustrate certain of the details of construction.
Figure 3:
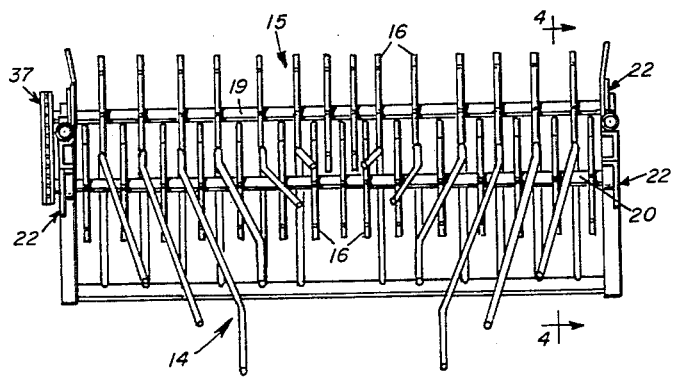
FIGURE 3 is a sectional view taken along lines 3—3 of FIGURE 2.
Figure 4:
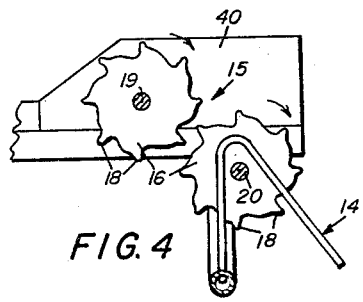
FIGURE 4 is a fragmentary sectional view taken along the lines 4—4 of FIGURE 3.

Referring now in detail to the drawings in which like reference characters designate like parts, the improved digger of the present invention, while applicable for digging other vined edibles growing or ripening underground, such as potatoes, is particularly designed for digging peanuts and will be so described as exemplary of the invention.

In its preferred form, the improved digger follows generally the construction of a conventional peanut digger. Thus, it has a longitudinally extending kicker frame 1 supported at the front on a pair of wheels 2 and at the rear on a smoothing roller 3 for smoothing the ground disturbed by the digging. For enabling it to follow the contour of the ground without corresponding movement of the kicker frame 1, the roller 3 is mounted on arms depending from and pivotally connected to the frame's side rails 5 intermediate their ends and yieldably supports the frame by upright resilient struts 6 extending between the rear parts of the arms and side rails. Substantially horizontal front frame members 7 fixed to and projecting or extending forwardly from the side rails 5, have fixed at the front to their undersides depending upright posts 8 each mounting at the bottom one of a pair of plows or plow blades, which, as usual, are substantially flat and laterally extending and tilt downwardly in a forward direction at an angle suitable for undercutting and digging out the peanuts. The front frame members are cross-connected at the front by a suitable crossbar 10.

A central suitable and suitably braced hitch or coupler 11, mounted at the front above the crossbar 10, is provided for connection or coupling the digger to the back of a tractor (not shown) for towing or pulling thereby. Also mounted at the front of the digger and projecting above the crossbar 10 is a gearbox 12 drivably connectable to a power takeoff (not shown) on the tractor and driving a drive shaft 13 journaled at its ends on the frame members 7. Designed to handle two rows of vines at the same time, the illustrated digger has mounted on the rear of the kicker frame 1 two laterally spaced sets of guide fingers or rods 14, one for each of the plows 9 and each having its fingers so arranged and constructed as to exert a lateral twisting action tending to turn over or upside down the row of vines passing thereover.

The kicker frame 1 of the improved kicker assembly 15 of the present invention preferably is straight or straight-sided and obliquely disposed longitudinally, the frame inclining or sloping upwardly toward the rear or back and at the front projecting below the front frame members 7 and toward but short of and being rearwardly spaced from the plows 9. Also conventionally, the frame 1 mounts a plurality or, more usually, multiplicity of laterally or traversally extending rows 16 of kickers or kicker discs 17. The individual kickers 17, as well, are conventional, each being serrated or toothed, with its teeth 18 facing opposite its direction of rotation so as to drive or kick the vines rearwardly along the frame without becoming entangled therein. While not necessarily intercalated, the kickers 17 of adjoining rows preferably are relatively staggered to prevent them from striking each other or catching vines therebetween.

Each of the rows 16 of kickers 17 is mounted between the side rails 5 on a shaft which extends across and has its end portions rotatably mounted or journaled on the rails. As noted earlier, a conventional digger has the positions of its kicker shafts fixed relative to its frame and the shafts, or, more precisely, their axes, are laterally aligned and lie in a common plane, thus precluding the rows adjacent the rear from applying the positive downward force found essential in conjunction with the guide fingers 14 for turning the vines upside down or over as they are returned to or redeposited on the ground. Even with a straight frame, this difficulty is completely circumvented in the kicker assembly 15 of the present invention by providing for at least the penultimate kicker shaft 19 an adjustable mounting which enables it not only to be mounted above the level of the ultimate or last shaft 20 and preceding shafts 21 so that the kickers 17 on the last two shafts can apply the necessary positive downward driving force to the vines in passing or transferring them to the guide fingers 14, but also to be adjusted in position to vary that driving force as necessary to suit different soil conditions. In the illustrated digger the penultimate shaft 19 and last shaft 20 are mounted respectively above and below the side rails 5 and both of these shafts are adjustably mounted to increase the range of possible adjustment of the downward driving force. Althougs the adjustable mounting can be extended to any of the preceding shafts 21, this usually will not be necessary and, as in the illustrated embodiment, these shafts ordinarily will be mounted on the undersides of the side rails 5 in the usual fixed or nonadjustable mountings.

Two forms of adjustable mountings have been disclosed, one in FIGS. 5 and 6 and the other in FIGS. 7 and 8. The former, designated as 22, includes an angle mounting bracket 23 and is particularly suited for use on a kicker frame in which the side rails 5 are of box or side opening channel shape. The other form, designated as 24, includes a flat mounting bracket 25 and is suited for use on any side rail having a flat side. Each of the mountings 22 and 24 is, of course, one of a pair of duplicate mountings for mounting the opposite end portions of the related shaft 19 or 20 on the two side rails 5. Each angle bracket 23 of the pair of duplicate or matched mountings 22 preferably has a flat, upstanding or upright flange or bearing plate 26 and a flat base flange 27 bent at right angles to the upright flange. The base flange 27 is designed for bolting to one of the top and bottom walls 28 of the side rail 5, as appropriate for the shaft 19 or 20, while the upright flange 26 is intended to have bolted to it a flanged or other suitable bearing or bushing 29. Two adjustments are possible, one, generally vertical, normal or perpendicular to the upwardly or downwardly facing adjoining wall 28 of the side rail and the other, longitudinal, longitudinally of the rail, with the adjustments derived from bolt-and-slot connections. Thus, for the illustrated flanged bearing 29 mountable by a pair of mounting bolts 30, the upright flange 26, for the desired vertical adjustment, will have a central slot 31 for the shaft 19 or 20 and side slots 32 for the bolts, all elongated to the desired extent in a direction perpendicular to the base flange 27 of the wall 28 engaged by that flange. In turn the base flange 27, with the illustrated pair of bracket mounting bolts 33, will provide longitudinal adjustment by having for each bolt a slot 34 elongated laterally of itself or longitudinally of the adjoining side rail 5.

Attachable to a side or side wall 35, rather than a top or bottom wall 28, of a side rail 5, the flat mounting bracket or plate 25 of the other mounting 24 must be taller of longer than the correspondingly upright or vertically disposed flange 26 of the first form to give the same range of adjustment but gives that adjustment in the same way by the same vertically elongated slots 31 and 32 formed in its portion projecting above or below the side rail. Adjustment horizontally or longitudinally of the rail is obtained by forming the longitudinally elongated slots 34 in the part of the plate 25 overlapping or engaging or abutting the side wall 35.

With at least the penultimate shaft 19 adjustably mounted by a pair of one or the other of the mountings 22 and 24, the several shafts 19, 20 and 21 are all driven in the same direction and preferably at the same speed, conveniently through a chain-and-sprocket drive 37 drivably connecting the several shafts to the drive shaft 13 and having sufficient slack in the connections to the shafts 19 and 20 to accommodate their range of adjustment and tensioners or slack adjusters 38 suitably placed there and elsewhere for eliminating undue slack in the drive during operation of the digger.

In digging up peanuts two rows at a time, the illustrated digger will be towed by a tractor with a plow 9 aligned with each row and, as the peanuts are dug up, the vines will be directed onto the leading or front row 16 of kickers 17 by guide bars 39 back of the plows. Thereafter, the vines will be moved or progressed rearwardly or backwardly along the kicker frame and at the same time shaken to release dirt clinging thereto, by the action of the kickers 17 of the several rows 16. Driven in an upsloping path to the row of kickers on the penultimate shaft 19, the vines thereafter will be driven in a downsloping path by the kickers of the penultimate shaft and the last shaft 20 to the guide fingers 14, and, so impelled, will be turned upside down by the lateral twisting or turning action of the guide fingers as they are redeposited on the ground. In passing over the frame the vines are guided and held in bounds laterally by guide plates or shields 40 fixed to the insides of the side rails 5.

The application of the invention to an existing digger will involve equipping the digger with sets of guide fingers 14, if it does not already have them. Otherwise, the essential modifications are removal of the original fixed bearings from the penultimate shaft 19, mounting of the shaft on top of the frame, above the level of the last shaft 20, by a pair of the adjustable mountings 22 or 24, increasing the length of the driving connections between the penultimate and adjoining shafts to accommodate the range of adjustment, and adding tensioners 38 to eliminate excess slack when the required adjustments have been made.

From the above detailed description it will be apparent that there has been provided an improved digger for peanuts and like edibles, the essentials of which are readily incorporable in both new and existing diggers for ensuring that the vines they dig up will be redeposited on the ground upside down and thus protect the peanuts from rotting in the interval between digging and harvesting. It should be understood that the described and disclosed embodiment is merely exemplary of the invention and that all modifications are intended to be included that do not depart from the spirit of the invention and the scope of the appended claims.

Having now described my invention, I claim:

1. A digger for peanuts and like underground edibles grown on vines, comprising longitudinally extending frame means, a plurality of laterally extending rows of kickers rotatably mounted in succession along said frame means each on one of a plurality of radially spaced shafts for progressively receiving and rearwardly driving vines with edibles attached dug up by plow means at a front of the digger, guide means at the rear of said frame means for engaging and tending laterally to turn vines discharged from a last of said rows as the vines return to the ground, and means mounting the shaft of the penultimate of said rows on said frame above the level of the shaft of said last row for enabling the penultimate and last rows to apply a positive downward driving force to the vines discharged onto said guide means by said last row, said mounting means being adjustable for selectively shifting the above level position of said shaft of said penultimate row relative to said shaft of said last row and by correspondingly changing the downward force applied by said rows to suit different soil conditions rendering said force and the turning tendency of said guide means effective to turn the vines upside down on returning to the ground.

2. A digger according to claim 1, wherein the shafts of the penultimate and last rows are both adjustably mounted respectively above the below the frame means for increasing the range of possible relative shifting of the shafts.

3. A digger according to claim 1, wherein the rows of kickers are so relatively positioned as progressively to lift the vines before applying the downward force thereto.

4. A digger according to claim 1, wherein the frame means is straight-sided and slopes upwardly toward the rear.

5. A digger according to claim 2, wherein the frame means is straight-sided and slopes upwardly toward the rear.

6. A digger according to claim 1, wherein the mounting means includes a pair of mounting brackets mounted on and projecting vertically from opposite side rails of the frame means and adjustably movable longitudinally thereof, and a pair of bearings journaling opposite end portions of the shaft of the penultimate row and each mounted on one of said brackets and adjustably movable thereon radially of the shaft and substantially normal to the adjoining side rail.

7. A digger according to claim 6, wherein each bracket is bolt-and-slot connected to each of the adjoining bearing and side rail.

8. A digger according to claim 7, wherein each bracket is flanged for mounting on a vertically facing wall of the adjoining side frame.

9. A digger according to claim 7, wherein each bracket is flat for mounting on a side wall of the adjoining side rail.

References Cited

UNITED STATES PATENTS

| | | | |
|---|---|---|---|
| 893,905 | 7/1908 | Dodge | 171—133 |
| 1,261,139 | 4/1918 | Lauritzen | 171—133 XR |
| 2,999,547 | 9/1961 | Long | 171—116 XR |
| 3,260,314 | 7/1966 | Edwards | 171—101 |

ANTONIO F. GUIDA, Primary Examiner